United States Patent [19]

Kobayashi

[11] Patent Number: 4,799,560

[45] Date of Patent: Jan. 24, 1989

[54] PORTABLE MAILING SCALE

[76] Inventor: Yukoh Kobayashi, 1118 S. Lake St., Apt. 8, Los Angeles, Calif. 90006

[21] Appl. No.: 95,762

[22] Filed: Sep. 14, 1987

[51] Int. Cl.$^4$ .......................... G01G 19/56; G01G 1/02
[52] U.S. Cl. ...................................... 177/148; 177/224
[58] Field of Search ................ 177/148, 149, 216, 224

[56] References Cited

U.S. PATENT DOCUMENTS

| 388,138 | 8/1888 | Knight | 177/216 X |
| 822,804 | 6/1906 | Willis | 177/216 |
| 2,646,979 | 7/1953 | Weber | 177/216 X |
| 3,599,738 | 8/1971 | Wickenberg | 177/216 X |
| 4,624,332 | 11/1986 | Mills | 177/216 X |

Primary Examiner—George H. Miller, Jr.

[57] ABSTRACT

This portable mailing scale is a small, economical, and accurate balance-type weight-scale, especially suitable for measuring light weight, such as letters, to determine correct postage. Because the scale is of the balance-type, its accuracy is far better than those of the spring-type, especially under light load. Although scales of the balance-type usually require a trial and error leveling or balancing operation and thus are less convenient to use than those of the spring-type, this invention does not require such cumbersome leveling operation.

Therefore, this invention combines both the accuracy of balance-type scales and the ease of use of spring-type scales.

20 Claims, 6 Drawing Sheets

PORTABLE MAILING SCALE

FIELD OF THE INVENTION

This invention relates to the fields of weight-scales as well as tools for mailing.

BACKGROUND OF THE INVENTION

This invention is an improvement of a produce of weight-scale sold by Pelouze Scale Co., Evanston, IL. The Pelouze's scale is small balance-type scale. Because it is of the balance-type, its accuracy is far better than other scales of the spring-type, especially under light load, such as letter mails. Although scales of the balance-type usually require a trial and error leveling or balancing operation and thus are less convenient to use than those of the spring-type, the Pelouze's scale does not require such cumbersome leveling operation. The Pelouze's scale employs rotational balancing by the gravitational force involving vertical rotation of the body of the scale. A balance is obtained between an object to weigh at one side and the body of the scale at the other side. In this way, the weight of the object is represented by the angle by which the object makes the body of the scale rotate.

Although the Pelouze's scale is practical and useful, a few inconveniences have been identified.

First, the pointer, by which reading of weight is made on a legend, tends to oscillate for a relatively long period of time. Such oscillation impedes prompt reading of weight.

Second, there is no provision made for adjusting the zero-position of the pointer. Therefore, a straightforward reading may include the zero-position error.

Third, the scale is capable of weighing only up to four ounces (approximately 80 grams). This limitation exists mainly because the scale uses only approximately 90 degrees of rotational angle of the scale body for measurement. Apparently, the scale would be able to double the measurable weight with the same rotational angle if the weight of the scale itself is doubled. However, a problem of this approach is that the rotational angle being the same and the maximum measurable weight being doubled, the accuracy of reading becomes sacrificed to a half.

This invention overcomes these problems.

OBJECT OF THE INVENTION

It is an object of the present invention to improve the existing product of Pelouze Scale Co., so that it can weigh heavier mails in a more accurate and convenient manner.

SUMMARY OF THE INVENTION

According to the present invention, a typical scale comprises a clip, a hanger, a body, a legend drawn on the body, and a pointer. The clip is attached to the body at the one end of the body and holds an object to weigh. The hanger is also attached to the body at a proper location on the body for hanging the body in the air, while providing a fulcrum around which the body can rotate according to the gravitational force. When the body is hung in the air with the hanger being held by one's finger(s) and an object being held by the clip, the body rotates around the fulcrum according to the gravitational force and reaches a balance at a position determined by the weights of both the object and the body. The weight of the object is indicated by the rotational angle of the body around the fulcrum. This angle is read on the legend through the pointer.

While said Pelouze's scale uses only approximately 90 degrees rotational angle of the scale body, the present invention typically utilizes a wider angle but less than 180 degrees. This is accomplished through a new arrangement of components as well as a new shape of the body of scale. There are unlimited number of shapes that could be used for the kind of scale discussed here. Theoretically, almost any kind of shapes, whether it may be a circle, a triangle, an eclipse, a square, a portion of these, or any randomly drawn shape, can serve as a body of scale. Therefore, selection and determination of a particular shape may be made in careful consideration of a usable angle, physical compactness, lightness, and economy of production. The task of determining a proper shape is a complex one.

ADVANTAGES OF THE INVENTION

This invention utilizes a wider rotational angle of body than the Pelouze's scale. Therefore, this invention is capable of weighing heavier objects than the Pelouze's scale with comparable accuracy.

In addition, the pointer by which reading of weight is made does not oscillate, unlike in the case of Pelouze's scale, and thus permits quick reading of weight.

Furthermore, the zero-position error of the pointer is eliminated by a simple adjustment of the pointer.

DESCRIPTION OF THE PREFERRED EMBODIMENT

For the purpose of promoting an understanding of the principles of this invention, reference will now be made to the embodiment illustrated in drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
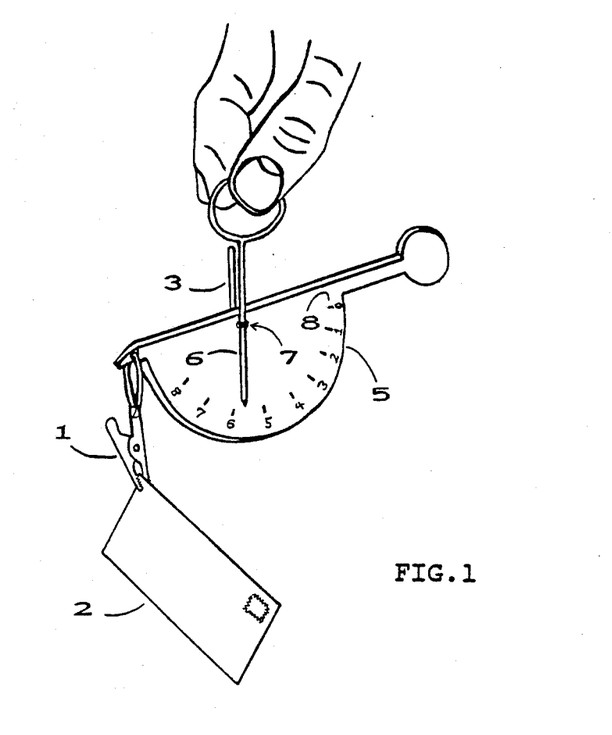
FIG. 1 is a perspective view of a portable mailing scale being in use according to a typical embodiment of this invention.

The portable mailing scale comprises, as shown by FIG. 1, a clip 1, which holds an object 2 to weigh, a hanger 3 to be held by a finger or fingers 4, a body 5 and a pointer 6. When the hanger 3 hangs the body 5 of the scale in the air, the position 7 in the figure constitutes a fulcrum, around which the body 5 rotates freely according to the gravitational force. After certain amount of rotation, the body 5 will reach a balanced position with the object 2. The weight of the object 2 is read through the pointer 6 on a legend 8. The balance is obtained as determined by the weights of the object 2 and the body 5. The zero-position of the pointer 6 can be adjusted by changing the angle of the pointer 6 at the fulcrum 7 or bending the body of the pointer 6.

Figure 2:
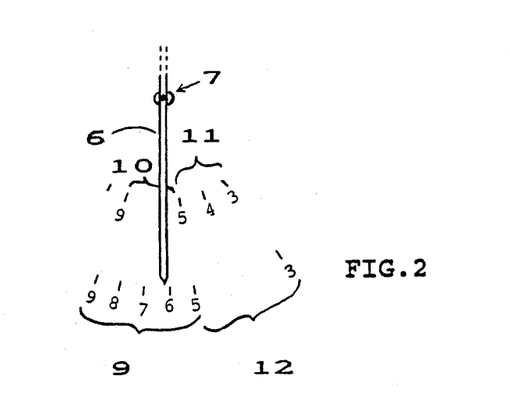
FIG. 2 is a portion of a legend showing both partial enlargement and reduction of marking.
Figure 3:
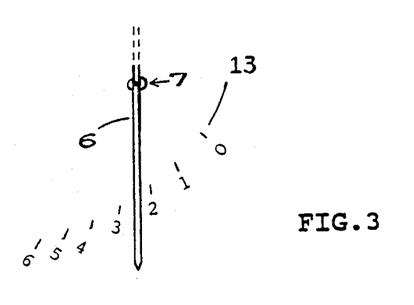
FIG. 3 is a portion of a legend showing continuous linearization of marking.

Because of the rotational motion of the scale, the spacing of marks in the legend 8 tends to be unequal. In other words, a portion of a marking of the legend 8 may be narrower or wider than other portions. This situation can be improved by enlarging or reducing a portion or portions of the marking as shown in FIG. 2. In FIG. 2, a portion 9 is an enlargement of a portion 10, while a portion 11 is a reduction of a portion 12. A method of continuous linearization of marking is shown by FIG. 3. As seen from FIG. 3, spacing of marks is more enlarged as marks in a legend 13 get closer to the tip, and further from the root, of the pointer 6.

Figure 4:
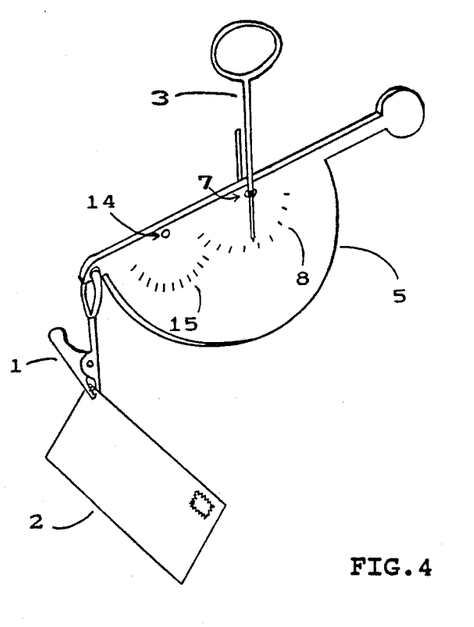
FIG. 4 is a perspective view of a portable mailing scale with two fulcrums.
Figure 5:
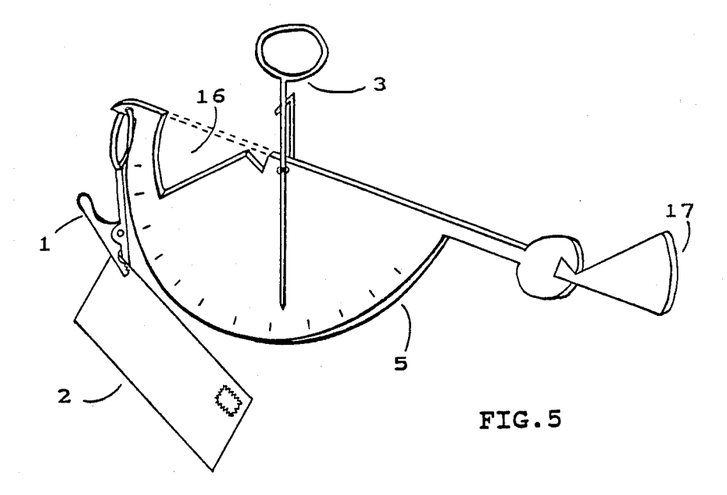
FIG. 5 is a perspective view of a portable mailing scale with a detachable piece of weight.
Figure 6:
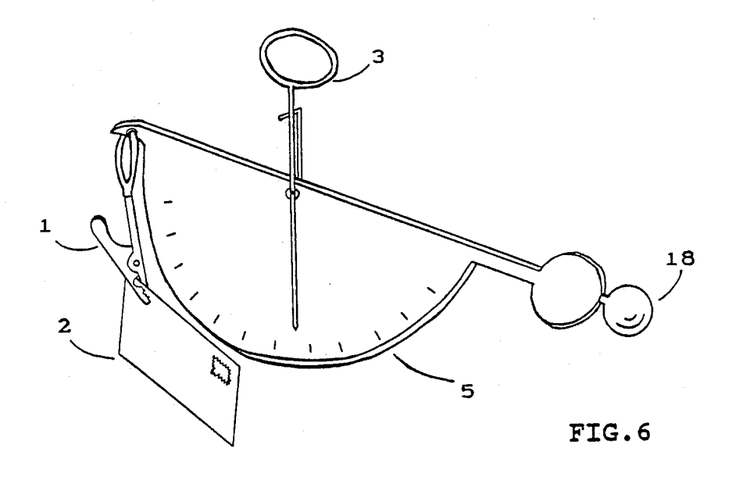
FIG. 6 is a perspective view of a portable mailing scale with an extra weight.

A wide range of weights can be weighed in this arrangement shown in FIG. 1 because it can utilize more than 90 degrees of rotational angle of the body 5. Further improvement on the range of weights can be made by providing an additional fulcrum 14 together with an additional legend 15, as shown in FIG. 4. By switching or moving the hanger 3 from one position to another, the range of measurable weights or the accuracy of measurement is increased. More than two fulcrums may be provided for a much wider range or more accuracy. FIG. 5 shows another method to increase the range of measurable weights, where a piece 16 of the body can be removed or moved to another location 17 on the body. Yet another method is shown by FIG. 6, where an auxiliary weight 18 is attached or detached to the body.

Figure 7:
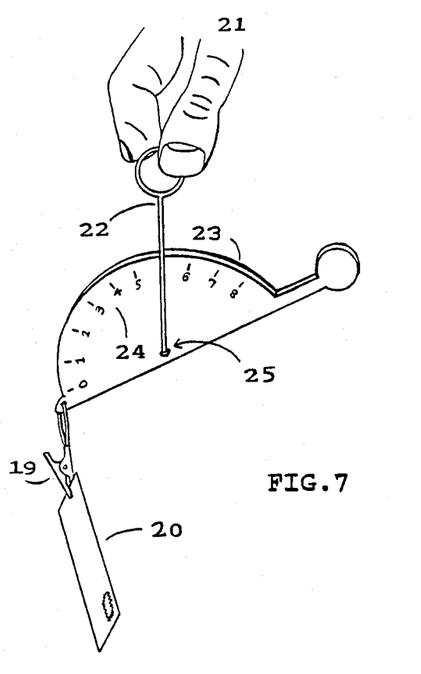
FIG. 7 is a perspective view of another portable mailing scale being in use according to a typical embodiment of this invention.
Figure 8:
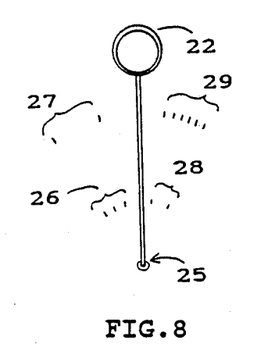
FIG. 8 is a portion of a legend showing both partial enlargement and reduction of marking.
Figure 9:
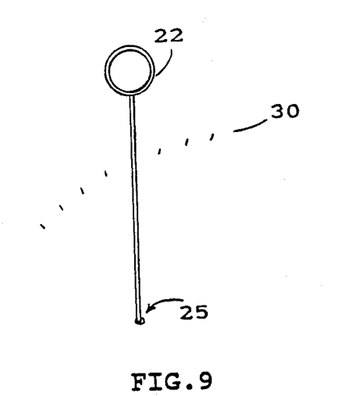
FIG. 9 is a portion of a legend showing contiuous linearization of marking.
Figure 10:
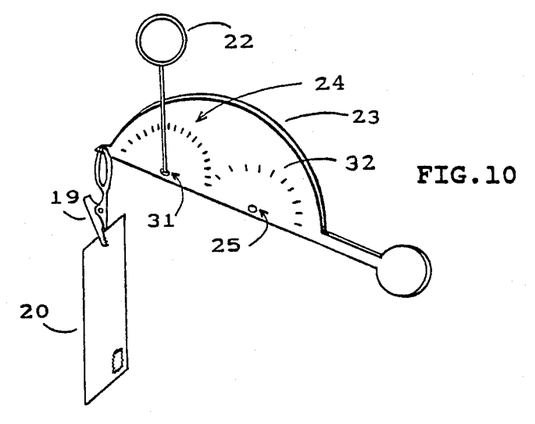
FIG. 10 is a perspective view of a portable mailing scale with two fulcrums.
Figures 11, 12:
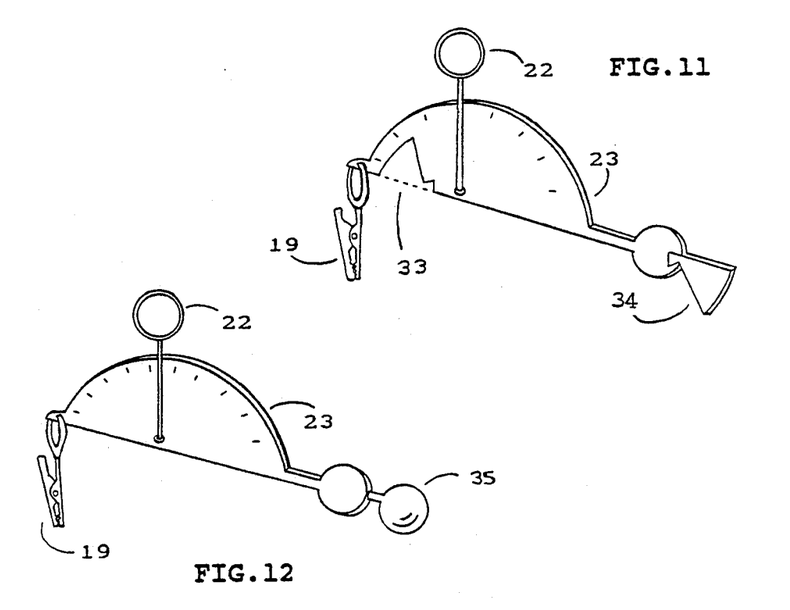
FIG. 11 is a perspective view of a portable mailing scale with a detachable piece of weight.
FIG. 12 is a perspective view of a portable mailing scale with an extra weight.

While in the embodiment described above a fulcrum or fulcrums were located at the upper part of the body of the scale, fulcrums may be located at the lower part of the body. This embodiment is shown by FIGS. 7 through 12, where a hanger points a legend for reading of weight eliminating an extra pointer. In other respects, this embodiment is the same as the one described above. In FIG. 7, a hanger 22, which is picked up with a finger or fingers 21, holds a body 23 in the air, while providing a fulcrum 25 around which the body 23 rotates according to the gravitational force. A clip 19 holds an object to weigh, such as a mail envelope 20. FIG. 8 shows enlargement and reduction of a portion of a marking. The marking 26 is a reduction of a portion 27 and the marking 29 is an enlargement of a portion 28. FIG. 9 shows a continuous and linearized marking 30 by means of a non-circular marking. FIG. 10 shows two fulcrums and legends. The hanger 22 can be moved from one position 25 to another position 31 and vice versa. FIG. 11 shows a detachable piece 33 of the body. By moving the detachable piece 33 from one position to another position 34 or vice versa, the range of measurable weights can be increased. FIG. 12 shows another method to increase the range of measurable weights, where an extra piece of weight 35 is attached to the body 23 or can be detached from the body 23.

Figure 13:
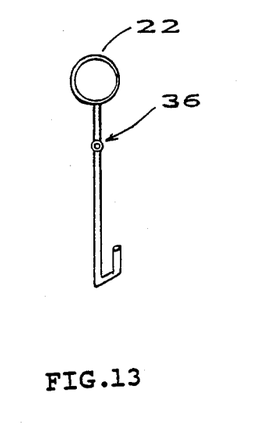
FIG. 13 is a hanger with a joint.

The zero-position of the hanger/pointer 22 can be adjusted by bending its body or changing its angle relative to the legend at a joint 36.

The above description shall not be construed as limiting the ways in which this invention may be practiced but shall be inclusive of many other variations that do not depart from the broad interest and intent of the invention.

What is claimed is:

1. A balanced weight-scale, comprising:
   a body;
   means for supporting said body in the air, while providing a fulcrum around which said body can rotate freely according to the gravitational force;
   means for holding an object to weigh at one side of said body;
   a legend whereon the weight of said object can be read; and
   a pointer for pointing the weight of said object on said legend;
   wherein said pointer is loosely fixed to said means for supporting the body of the scale when in use, whereby the zero-position of said pointer relative to said legend can be adjusted by changing the pointing direction of said pointer at the fixed point.

2. A balanced weight-scale as defined in claim 1, wherein it further comprises:
   means for easily moving said means for supporting said body from one fixed position to another without a slot on said body; and
   one or more legends whereon the weight of said object can be read;
   whereby the range of measurable weight may be increased or more accurate reading may be obtained.

3. A balanced weight-scale as defined in claim 1, wherein it further comprises:
   said body of the scale comprises one or more detachable pieces;
   means for holding one or more of said one or more detachable pieces on said body of the scale at one or more fixed positions; and
   one or more legends whereon the weight of said object can be read;
   whereby the range of measurable weight may be increased or more accurate reading may be obtained.

4. A balanced weight-scale as defined in claim 1, wherein it further comprises:
   one or more auxiliary pieces of weight;
   means for holding said one or more auxiliary pieces of weight on said body of the scale at one position; and
   one or more legends whereon the weight of said object can be read;
   whereby the range of measurable weight may be increased or more accurate reading may be obtained.

5. A balanced weight-scale as defined in claim 1, wherein a portion of said legend is pointed by a part of the body of said pointer whereby a particular range of weight is read being enlarged or reduced.

6. A balanced weight-scale, comprising:
   a body;
   means for holding an object to weigh at one side of said body;

a legend whereon the weight of said object can be read; and means for supporting said body in the air with one or more joints, while providing means for pointing the weight of said object on said legend as well as a fulcrum around which said body can rotate freely according to the gravitational force;

wherein the zero-position of said means for supporting said body in the air relative to said legend can be adjusted by changing the direction of said means for supporting said body in the air at said one or more joints.

7. A balanced weight-scale as defined in claim 6, wherein it further comprises:

means for easily moving said means for supporting said body from one fixed position to another without a slot on said body; and one or more legends whereon the weight of said object can be read;

whereby the range of measurable weight may be increased or more accurate reading may be obtained.

8. A balanced weight-scale as defined in claim 6, wherein it further comprises:

said body of the scale comprises one or more detachable pieces;

means for holding one or more of said one or more detachable pieces on said body of the scale at one or more fixed positions; and one or more legends whereon the weight of said object can be read;

whereby the range of measurable weight may be increased or more accurate reading may be obtained.

9. A balanced weight-scale as defined in claim 6, wherein it further comprises:

one or more auxiliary pieces of weight;

means for holding said one or more auxiliary pieces of weight on said body of the scale at one position; and one or more legends whereon the weight of said object can be read;

whereby the range of measurable weight may be increased or more accurate reading may be obtained.

10. A balanced weight-scale as defined in claim 6, wherein a portion of said legend is pointed at a different part of said means for supporting said body in the air, whereby a particular range of weight is read being enlarged or reduced.

11. A balanced weight-scale, comprising:

a body;

means for supporting said body in the air, while providing a fulcrum around which said body can rotate freely according to the gravitational force;

means for holding an object to weigh at one side of said body;

a legend whereon the weight of said object can be read; and a pointer for pointing the weight of said object on said legend;

wherein said pointer is located directly beneath said means for supporting said body of the scale in the air and the zero-position of said pointer relative to said legend can be adjusted easily by bending the body of said pointer.

12. A balanced weight-scale as defined in claim 11, wherein it further comprises:

means for easily moving said means for supporting said body from one fixed position to another without a slot on said body; and one or more legends whereon the weight of said object can be read;

whereby the range of measurable weight may be increased or more accurate reading may be obtained.

13. A balanced weight-scale as defined in claim 11, wherein it further comprises:

said body of the scale comprises one or more detachable pieces;

means for holding one or more of said one or more detachable pieces on said body of the scale at one or more fixed positions; and one or more legends whereon the weight of said object can be read;

whereby the range of measurable weight may be increased or more accurate reading may be obtained.

14. A balanced weight-scale as defined in claim 11, wherein it further comprises:

one or more auxiliary pieces of weight;

means for holding said one or more auxiliary pieces of weight on said body of the scale at one position; and one or more legends whereon the weight of said object can be read; whereby the range of measurable weight may be increased or more accurate reading may be obtained.

15. A balanced weight-scale as defined in claim 11, wherein a portion of said legend is pointed by a part of the body of said pointer whereby a particular range of weight is read being enlarged or reduced.

16. A balanced weight-scale, comprising:

a body;

means for holding an object to weigh at one side of said body;

a legend whereon the weight of said object can be read; and means for supporting said body in the air, while providing means for pointing the weight of said object on said legend as well as a fulcrum around which said body can rotate freely according to the gravitational force;

wherein the zero-position of said means for supporting said body in the air relative to said legend can be adjusted easily by bending the body of said means for supporting said body in the air.

17. A balanced weight-scale as defined in claim 16, wherein it further comprises:

means for easily moving said means for supporting said body from one fixed position to another without a slot on said body; and one or more legends whereon the weight of said object can be read;

whereby the range of measurable weight may be increased or more accurate reading may be obtained.

18. A balanced weight-scale as defined in claim 16, wherein it further comprises:

said body of the scale comprises one or more detachable pieces;

means for holding one or more of said one or more detachable pieces on said body of the scale at one or more fixed positions; and one or more legends whereon the weight of said object can be read; whereby the range of measurable weight may be increased or more accurate reading may be obtained.

19. A balanced weight-scale as defined in claim 16, wherein it further comprises:

one or more auxiliary pieces of weight;

means for holding said one or more auxiliary pieces of weight on said body of the scale at one position; and one or more legends whereon the weight of said object can be read; whereby the range of measurable weight may be increased or more accurate reading may be obtained.

20. A balanced weight-scale as defined in claim 16, wherein a portion of said legend is pointed by a different part of said means for supporting said body in the air, whereby a particular range of weight is read being enlarged or reduced.

* * * * *